(12) United States Patent
Tomkins et al.

(10) Patent No.: US 9,552,560 B1
(45) Date of Patent: Jan. 24, 2017

(54) FACILITATING COMMUNICATION BETWEEN EVENT ATTENDEES BASED ON EVENT STARTING TIME

(71) Applicant: Google Inc., Mountain View, CA (US)

(72) Inventors: Andrew Tomkins, Menlo Park, CA (US); Shanmugasundaram Ravikumar, Berkeley, CA (US); Shalini Agarwal, San Francisco, CA (US); Bo Pang, Sunnyvale, CA (US); Mark Yinan Li, San Francisco, CA (US)

(73) Assignee: Google Inc., Mountain View, CA (US)

( * ) Notice: Subject to any disclaimer, the term of this patent is extended or adjusted under 35 U.S.C. 154(b) by 355 days.

(21) Appl. No.: 14/145,189

(22) Filed: Dec. 31, 2013

(51) Int. Cl.
  *G06Q 10/00* (2012.01)
  *G06Q 10/06* (2012.01)
(52) U.S. Cl.
  CPC .............. *G06Q 10/06311* (2013.01)
(58) Field of Classification Search
  USPC ......... 705/7.11–7.42; 701/400; 709/204–207
  See application file for complete search history.

(56) References Cited

U.S. PATENT DOCUMENTS

| | | | | |
|---|---|---|---|---|
| 4,360,875 A | * | 11/1982 | Behnke ............... | G01C 21/00 379/93.02 |
| 5,559,707 A | * | 9/1996 | DeLorme ............ | G01C 21/20 340/990 |
| 5,603,054 A | | 2/1997 | Theimer et al. | |
| 6,115,709 A | | 9/2000 | Gilmour et al. | |
| 6,253,148 B1 | * | 6/2001 | Decaux ............... | G08G 1/123 246/5 |
| 6,424,910 B1 | * | 7/2002 | Ohler ................. | G01C 21/3438 340/988 |
| 6,438,543 B1 | | 8/2002 | Kazi et al. | |
| 6,480,830 B1 | * | 11/2002 | Ford ................... | G06Q 10/109 705/7.19 |
| 6,842,877 B2 | | 1/2005 | Robarts et al. | |
| 6,898,569 B1 | * | 5/2005 | Bansal ............. | G06Q 10/063116 340/994 |

(Continued)

OTHER PUBLICATIONS

Martin Brinkmann "How to Enable Phone Notifications in Google Calendar" (http://www.ghacks.net/2012/01/20/how-to-enable-phone-notifications-in-google-calendar/; Jan. 20, 2012.*

(Continued)

*Primary Examiner* — Alan S Miller
(74) *Attorney, Agent, or Firm* — Middleton Reutlinger (57) ABSTRACT

Methods and apparatus related to identifying an event task of a user, identifying one or more other attendees of the event, determining user arrival information for the user, and determining a notification to provide to at least one of the other attendees based on the user arrival information. The event task includes a starting time for an event and an event location, and the user arrival information is based on location information of the user and information associated with the event task. In some implementations, the user and/or the at least one of the other attendees may provide authorization for a notification to determined and/or sent. The notification may include information regarding the likelihood of the user arriving at the event before and/or after the starting time of the event.

11 Claims, 6 Drawing Sheets

(56) References Cited

U.S. PATENT DOCUMENTS

| | | | |
|---|---|---|---|
| 6,975,997 B1* | 12/2005 | Murakami | B60L 11/1824 705/5 |
| 7,027,995 B2* | 4/2006 | Kaufman | G06Q 10/109 705/7.12 |
| 7,080,019 B1* | 7/2006 | Hurzeler | G06Q 10/08 705/6 |
| 7,082,364 B2* | 7/2006 | Adamczyk | G01C 21/3438 340/988 |
| 7,085,818 B2* | 8/2006 | Brown | G06Q 30/02 709/217 |
| 7,353,034 B2* | 4/2008 | Haney | H04W 12/08 455/411 |
| 7,496,500 B2 | 2/2009 | Reed et al. | |
| 7,693,735 B2* | 4/2010 | Carmi | G06Q 10/063116 705/7.16 |
| 7,702,631 B1 | 4/2010 | Basu et al. | |
| 7,813,916 B2 | 10/2010 | Bean | |
| 7,856,300 B2* | 12/2010 | Hozumi | B60N 2/0244 297/284.9 |
| 8,046,226 B2 | 10/2011 | Soble et al. | |
| 8,055,707 B2 | 11/2011 | Desai et al. | |
| 8,090,707 B1* | 1/2012 | Orttung | G06Q 10/025 705/319 |
| 8,108,206 B2 | 1/2012 | Hufnagel et al. | |
| 8,121,953 B1* | 2/2012 | Orttung | G06Q 10/1095 705/35 |
| 8,140,256 B1* | 3/2012 | dos-Santos | G06Q 10/025 701/117 |
| 8,145,417 B1* | 3/2012 | Chitre | G01C 21/362 264/328.3 |
| 8,150,608 B2* | 4/2012 | Cobbold | G06Q 10/10 701/117 |
| 8,219,115 B1* | 7/2012 | Nelissen | H04W 4/021 455/414.1 |
| 8,285,570 B2* | 10/2012 | Meyer | G06Q 10/02 705/5 |
| 8,364,467 B1 | 1/2013 | Bowman et al. | |
| 8,375,099 B2 | 2/2013 | Carroll et al. | |
| 8,417,650 B2 | 4/2013 | Graepel et al. | |
| 8,521,818 B2 | 8/2013 | McGann et al. | |
| 8,560,487 B2 | 10/2013 | Jhoney et al. | |
| 8,599,801 B2 | 12/2013 | Baio et al. | |
| 2001/0056363 A1* | 12/2001 | Gantz | G06Q 10/02 705/500 |
| 2002/0062192 A1* | 5/2002 | Saraga | G06F 17/3087 701/465 |
| 2002/0138325 A1* | 9/2002 | Mashimo | G06Q 10/02 705/5 |
| 2003/0100993 A1* | 5/2003 | Kirshenbaum | G01C 21/26 701/408 |
| 2003/0109266 A1* | 6/2003 | Rafiah | G01C 21/3423 455/456.1 |
| 2003/0177020 A1* | 9/2003 | Okamura | G06Q 10/02 705/5 |
| 2004/0049424 A1* | 3/2004 | Murray | G06Q 10/04 705/14.14 |
| 2005/0033614 A1* | 2/2005 | Lettovsky | G06Q 10/025 705/5 |
| 2006/0022048 A1* | 2/2006 | Johnson | H04L 69/329 235/462.1 |
| 2006/0111835 A1* | 5/2006 | Baker | G01C 21/26 701/408 |
| 2006/0155460 A1* | 7/2006 | Raney | G01C 21/20 701/468 |
| 2006/0173841 A1* | 8/2006 | Bill | G01C 21/3407 |
| 2006/0276960 A1* | 12/2006 | Adamczyk | G01C 21/00 701/516 |
| 2007/0106468 A1* | 5/2007 | Eichenbaum | G01C 21/343 701/431 |
| 2007/0250257 A1* | 10/2007 | Almy | G01C 21/20 701/532 |
| 2007/0264969 A1* | 11/2007 | Frank | G06Q 10/1095 455/404.2 |
| 2007/0271031 A1* | 11/2007 | Jung | G01C 21/3407 701/465 |
| 2007/0281689 A1* | 12/2007 | Altman | G06Q 30/0207 455/435.1 |
| 2008/0054072 A1* | 3/2008 | Katragadda | G08G 1/123 235/384 |
| 2008/0091342 A1* | 4/2008 | Assael | G08G 1/202 701/533 |
| 2008/0167937 A1* | 7/2008 | Coughlin | G01C 21/20 705/7.16 |
| 2008/0171559 A1* | 7/2008 | Frank | G06Q 30/02 455/456.5 |
| 2009/0204434 A1* | 8/2009 | Breazeale, Jr. | G07C 1/10 705/3 |
| 2009/0307212 A1 | 12/2009 | Ramot et al. | |
| 2010/0121662 A1* | 5/2010 | Becker | G06Q 10/02 705/5 |
| 2010/0211425 A1* | 8/2010 | Govindarajan | G01C 21/34 705/7.16 |
| 2010/0269049 A1* | 10/2010 | Fearon | G06Q 10/109 715/744 |
| 2010/0274569 A1* | 10/2010 | Reudink | G06Q 30/02 705/1.1 |
| 2010/0274865 A1* | 10/2010 | Frazier | G06Q 10/00 709/207 |
| 2010/0332282 A1* | 12/2010 | Bradley | G01C 21/3438 705/7.19 |
| 2011/0010220 A1* | 1/2011 | Burnham | G06Q 10/109 705/7.19 |
| 2011/0028132 A1* | 2/2011 | Bos | H04M 3/42348 455/414.2 |
| 2011/0066468 A1* | 3/2011 | Huang | G01C 21/3438 705/7.19 |
| 2011/0113148 A1* | 5/2011 | Salmela | G01C 21/3438 709/229 |
| 2011/0130958 A1* | 6/2011 | Stahl | G01C 21/362 701/533 |
| 2011/0252097 A1* | 10/2011 | Walker | G06Q 10/06 709/206 |
| 2012/0005221 A1 | 1/2012 | Ickman et al. | |
| 2012/0030588 A1 | 2/2012 | Sinha | |
| 2012/0050033 A1* | 3/2012 | Westen | G01S 5/0027 340/539.13 |
| 2012/0053980 A1* | 3/2012 | Basson | G06Q 10/06316 705/7.26 |
| 2012/0136572 A1* | 5/2012 | Norton | G01C 21/3407 701/465 |
| 2012/0150532 A1 | 6/2012 | Mirowski et al. | |
| 2012/0232776 A1* | 9/2012 | Gontmakher | G08G 1/127 701/117 |
| 2012/0239761 A1 | 9/2012 | Linner et al. | |
| 2012/0290652 A1* | 11/2012 | Boskovic | G06Q 50/30 709/204 |
| 2012/0317499 A1 | 12/2012 | Shen | |
| 2012/0331036 A1 | 12/2012 | Duan et al. | |
| 2013/0041941 A1* | 2/2013 | Tomasic | G08G 1/123 709/203 |
| 2013/0073662 A1 | 3/2013 | Meunier et al. | |
| 2013/0090965 A1* | 4/2013 | Rivere | G06Q 10/06311 705/7.15 |
| 2013/0096813 A1* | 4/2013 | Geffner | H04W 4/003 701/117 |
| 2013/0115927 A1* | 5/2013 | Gruber | H04W 4/16 455/414.1 |
| 2013/0159270 A1 | 6/2013 | Urmy et al. | |
| 2013/0290436 A1 | 10/2013 | Martin et al. | |
| 2013/0297551 A1 | 11/2013 | Smith et al. | |
| 2013/0317873 A1* | 11/2013 | Kozloski | G06Q 10/109 705/7.19 |

(56) References Cited

U.S. PATENT DOCUMENTS

2014/0074536 A1* 3/2014 Meushar ............ G06Q 10/1095
　　　　　　　　　　　　　　　　　　　　　　　705/7.19

OTHER PUBLICATIONS

Corston-Oliver, Simon et al, "Task-Focused Summarization of Email," Microsoft Research Jul. 2004, (http://www1.cs.columbia.edu/~lokesh/pdfs/Corston.pdf), 8 pages.

Laclavik, et al., "Email Analysis and Information Extraction for Enterprise Benefit," Institute of Informatics, Slovak Academy of Sciences, Slovakia, Computing and Informatics, vol. 30, 2011, pp. 57-87.

* cited by examiner

Attendee Notification

Jim Smith will be late to the event "Bob's Birthday!!"

Current Time: 7:55
Event Start Time: 8:00
Estimated Arrival Time: 8:15

FACILITATING COMMUNICATION BETWEEN EVENT ATTENDEES BASED ON EVENT STARTING TIME

BACKGROUND

A user may have interest in creating one or more tasks and the user may utilize one or more applications to create the tasks. For example, a user may have interest in creating a task that is related to attending an event and a task may be created that includes information related to the event.

SUMMARY

This specification is directed to methods and apparatus related to determining a notification to provide to one or more attendees of an event based on arrival information of a user. An event of a user may be identified that includes a starting time and an event location. One or more attendees of the event may be identified and a notification may be provided to the attendees related to the arrival of the user at the event. The notification may be provided to the attendees only after the user and/or a receiving attendee has authorized the notification. The notification may be related to a future arrival of the user at the event and/or the notification may be related to the user already arriving at the event. Some implementations of the specification are generally directed to identifying an event task of a user, identifying at least one other attendee of the event, receiving user location information that is indicative of a user location, determining user arrival information based on the user location information and the starting time of the event, and determining a notification to provide to at least one of the other attendees based on the user arrival information. Some implementations of the specification are directed to providing the notification to at least one of the other attendees of the event if the user is unlikely to arrive at the event before the starting time of the event. Some implementations of the specification are directed to providing the notification to at least one of the other attendees that includes information related to the arrival of the user at the event.

In some implementations, a method is provided that include the steps of: identifying, via one or more databases, an event task of a user, the event task including a starting time of an event and an event location; identifying, via one or more databases, one or more other attendees of the event; receiving user location information indicative of a user location; determining user arrival information, the user arrival information based on the user location information and the starting time; and determining a notification to provide to at least one of the other attendees, the determining based on the user arrival information and the event task.

This method and other implementations of technology disclosed herein may each optionally include one or more of the following features.

The user arrival information may be distance between the user and the event location. The user arrival information may be an estimated arrival time, and the step of determining the estimated arrival time may be based on length of an estimated travel path of the user, the notification provided to the at least one of the other attendees based on the estimated arrival time. The notification may be provided to the at least one of the other attendees if the estimated arrival time is after the starting time.

The step of determining the notification may be based on the magnitude of the difference between the estimated arrival time and the starting time. The notification may be provided to the least one of the other attendees if the estimated arrival time is before the starting time. The step of determining the estimated travel path may include determining a mode of transportation of the user.

The user arrival information may be based on a user starting location. The notification may be indicative of the user leaving the starting location.

The user arrival information may be indicative of the user being within a threshold distance of the event location, the notification including the user location.

Other implementations may include a non-transitory computer readable storage medium storing instructions executable by a processor to perform a method such as one or more of the methods described herein. Yet another implementation may include a system including memory and one or more processors operable to execute instructions, stored in the memory, to perform a method such as one or more of the methods described herein.

Particular implementations of the subject matter described herein determine user arrival information for an event of a user and determine a notification to provide to one or more other attendees of the event based on the user arrival information. The user arrival information may be determined based on the location of the user and the starting time of the event. The notification may optionally be provided to at least one of the attendees only with the permission of the user and/or a given receiving attendee.

It should be appreciated that all combinations of the foregoing concepts and additional concepts discussed in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

A user may create an event and may have interest in providing one or more other attendees of the event with a notification based on the location of the user. For example, a user may intend to attend an event and may have interest in providing one or more other attendees of the event with a notification prior to the start of the event if the user will likely arrive at the event after the starting time of the event. Additionally or alternatively, a user may have interest in providing one or more other attendees of an event with information regarding the current location of the user, such as when the user is proximately located to the event and/or when the user is en route to the event. For example, a user may have interest in providing one or more attendees with a notification when the user is leaving a starting location to travel to the event and/or the user may have interest in providing a notification to other attendees of an event when the user has parked near the event, such as a notification providing other attendees with information regarding where parking spaces may be available near the event and/or traffic conditions near the event.

In some implementations, a notification may be provided to attendees of an event only when a given attendee has granted authorization to send and/or receive notifications. For example, an attendee may have interest in receiving only certain types of notifications from other users, notifications from certain users, and/or an attendee may not have interest in receiving any notifications related to an event. In some implementations, a user may be prompted before a notification is provided to ensure that the user has interest in sending the notification prior to the notification being sent. For example, a user may not have interest in sending information regarding the location of the user and/or may not have interest in sending a notification at all.

Figure 1:
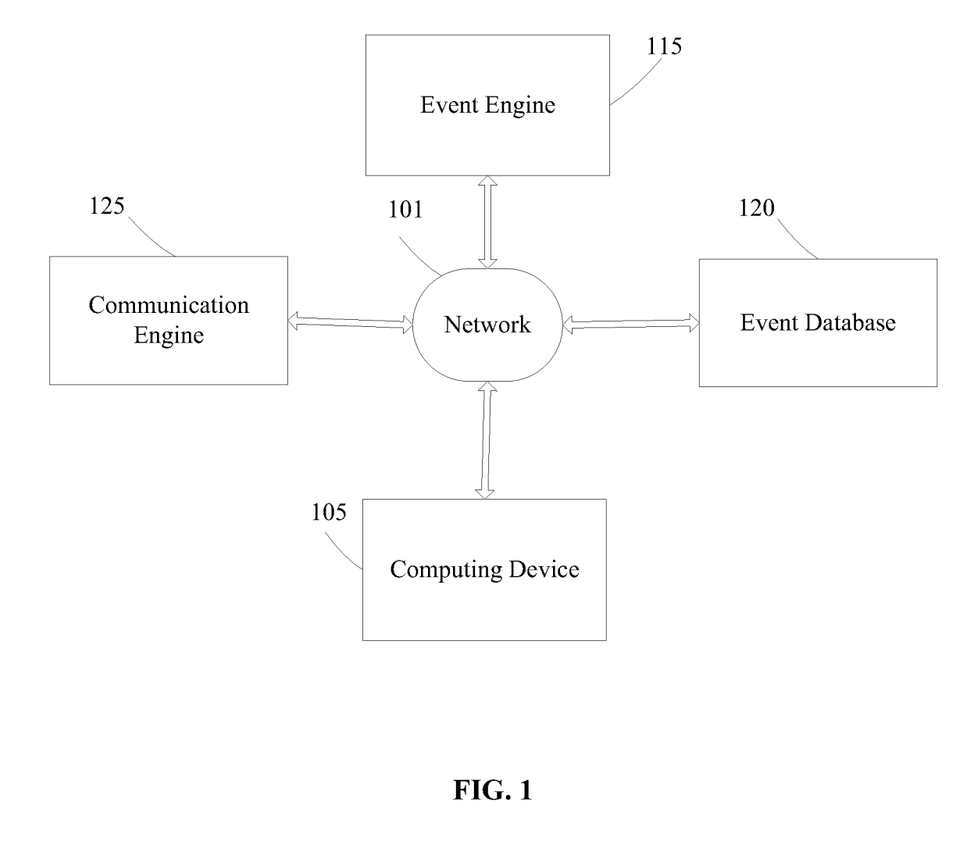
FIG. 1 is a block diagram of an example environment in which a method of determining a notification to provide to one or more attendees of an event based on user arrival information may be implemented.

Referring to FIG. 1, a block diagram of an example environment is illustrated in which a method of determining a notification to provide to one or more attendees of an event based on user arrival information may be implemented. The environment includes computing device 105, event engine 115, communication engine 125, and event database 120. The environment also includes a communication network 101 that enables communication between various components of the environment. In some implementations, the communication network 101 may include the Internet, one or more intranets, and/or one or more bus subsystems. The communication network 101 may optionally utilize one or more standard communications technologies, protocols, and/or inter-process communication techniques.

Figure 5:
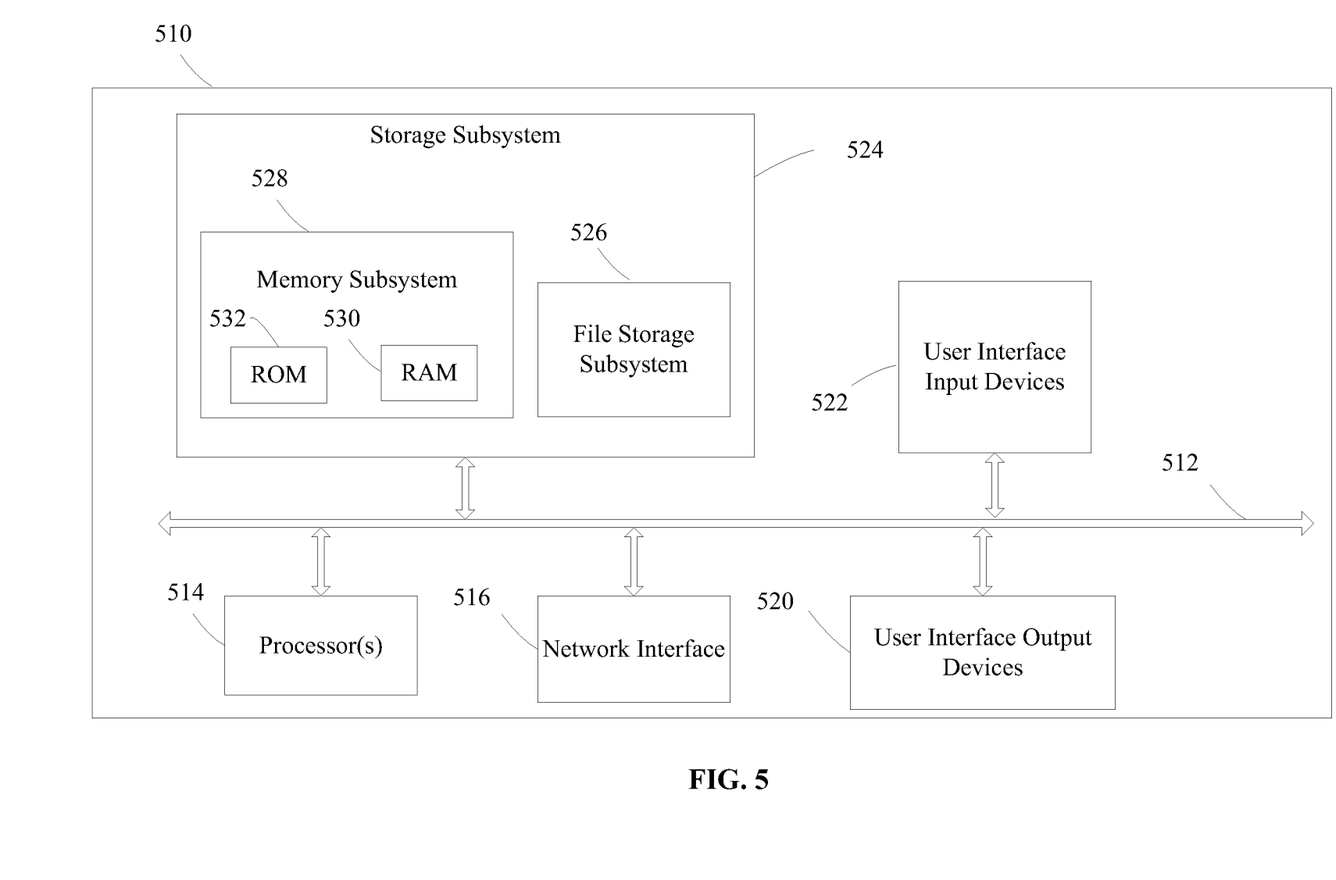
FIG. 5 illustrates a block diagram of an example computer system.

The computing device 105, event engine 115, communication engine 125, event database 120, and/or one or more additional components of the example environment of FIG. 1 may each include memory for storage of data and software applications, a processor for accessing data and executing applications, and components that facilitate communication over a network. In some implementations, computing device 105, event engine 115, communication engine 125, and/or event database 120 may include hardware that shares one or more characteristics with the example computer system that is illustrated in FIG. 5. The operations performed by components of the example environment may be distributed across multiple computer systems. For example, event engine 115, communication engine 125, and/or event database 120 may be computer programs running on computing device 105 and/or on one or more computers in one or more locations that are coupled to each other through a network.

The computing device 105 executes one or more applications and may be, for example, a desktop computer, a laptop computer, a cellular phone, a smartphone, a personal digital assistant (PDA), a tablet computer, a navigation system, a wearable computer device (e.g., glasses, watch, earpiece), and/or other computing device. The computing device 105 includes memory for storage of data and software applications, a processor for accessing data and executing applications, and components that facilitate communication over the communication network 101. In some implementations, the computing device 105 may include hardware that shares one or more characteristics with the example computer system that is illustrated in FIG. 5. In some implementations, the computing device 105 may include software and/or hardware that may be utilized to determine a location for the user and/or for the computing device 105, such as GPS. As discussed herein, the computing device 105 may optionally be utilized to, directly or indirectly, identify an event of a user, determine location of the user, determine user arrival information, and/or determine a notification to provide to one or more other attendees of the event based on the user arrival information.

The computing device 105 may further include hardware and/or software that may be utilized to determine location data indicative of the location of the computing device 105. For example, location data may be identified based on GPS and/or estimation of the location of the computing device 105 via cellular signals, Wi-Fi signals, and/or other radio frequency (RF) signals. In some implementations, the computing device 105 may include one or more location sensors. For example, location sensors may include a GPS device and/or an RF transmitter and/or receiver to enable identification of the location of the computing device 105. Any estimation of the location of the computing device 105 via RF and/or other signals may be made by the computing device 105 directly and/or via other computing devices. In some implementations, location information of a user may be identified by one or more other systems and provided to computing device 105 and/or event engine 115. For example, location information of a user may be based on user check-ins, other user indicated visits to locations, and/or interaction with other computing devices. For example, location information may be based on a user checking in to a location via one or more applications and the utilized application may provide user location information that is indicative of the location of the computing device 105 and/or its associated user. Also, for example, location data may be based on communication between the computing device 105 and one or more other computing devices having a location property; and the identified location may be based on such location property. For example, pairing of the computing device 105 with a computing device of a vehicle may be indicative of the user being located in a vehicle.

Event engine 115 may be utilized to identify one or more event tasks of a user. An event task is a task of the user that is indicative of the user traveling to an event location and may include additional information about the task, such as a starting time of the event, an ending time of the event, and/or a purpose for the event. In some implementations, the event may be associated with one or more other attendees who, in addition to the user, are planning to attend the event and/or have indicated an interest in attending the event. Examples of an event may be a business meeting, a dinner event, and/or a party event.

In some implementations, one or more events may be identified by event engine 115 in a database that shares one or more characteristics with the event database 120. Event database 120 may include one or more storage media. For example, in some implementations, the event database 120 may include multiple computer servers each containing one or more storage media. Information discussed herein may optionally be stored in the event database 120 and/or an additional database. For example, an event task may be identified via an entity in the event database 120 and the entity may be associated with one or more event attendees, a location of the event, a starting time of the event, an event type, and/or additional or alternative information. Additional information related to one or more event tasks may be stored in event database 120 and/or an additional database. For example, event database 120 may include email addresses, cellular phone numbers, and/or social media identifiers of contacts of the user which may be utilized by one or more components to provide a notification to a contact when the contact is identified as an attendee of an event.

In some implementations, the user may create an event task utilizing one or more applications executing on computing device 105. For example, computing device 105 may include an application that is dedicated to scheduling tasks and the user may create an event task utilizing the application. In some implementations, a user may provide information about the event, such as event time, event location, and/or other attendees of an event. For example, a calendar application executing on, and/or accessible via, computing device 105 may include a feature to create an event and submit the event to include on a calendar of the user. The calendar application or a module of the calendar application may include an option to send an indication of the event, such as an invitation to the created event, to one or more other potential attendees. In some implementations, a social networking application may include a feature to create an event task and may allow a user that creates an event task to provide an invitation to one or more other contacts. In some implementations, an event application may identify an event from one or more documents of a user, such as emails of the user, and create an event task based on information identified from the documents.

In some implementations, event engine 115 may identify an upcoming event via event database 120 of a user. In some implementations, an upcoming event may be identified based on the starting time of the event. For example, event engine 115 may monitor events of a user in event database 120 and identify events that include starting times that are within 24 hours of the current time. Also, for example, event engine 115 may monitor one or more event tasks of a user and identify the next upcoming event of the user. In some implementations, the identified event task may have been created by the user. In some implementations, the identified event task may have been created by another attendee of the event and the user may have been provided with an invitation to attend the event via computing device 105. For example, another attendee of an event may create an event task, send an invitation to the user via computing device 105, the user may accept the event invitation, and the event task may be associated with the user and stored in event database 120 for utilization by event engine 115.

Event engine 115 may identify one or more attendees that are associated with the identified event task. For example, the event task may have been created utilizing a calendar application of the user and the user may have indicated one or more additional users to invite to the associated event. In some implementations, invitations may be sent by communication engine 125 to other potential attendees via email, text messages, one or more event applications executing on computing devices of users, and/or utilizing a social networking website. In some implementations, event engine 115 may identify one or more messages that were utilized to create an event and determine attendees based on senders and/or receivers of the messages. For example, event engine 115 may identify an event that was created utilizing a message trail and determine the senders and/or recipients of the message trail as attendees of the associated event.

Communication engine 125 may identify contact information for designated potential attendees of the event via one or more databases that include contact information of contacts of the user. In some implementations, contact information may include email addresses, phone numbers, and/or another identifier of a contact of the user. In some implementations, contact information for potential attendees of an event may be identified via one or more applications executing on computing device 105. For example, communication engine 125 may identify contact information via a contacts database, an email database, and/or a calendar application associated with the user. In some implementations, the user may create the event task via an email application and/or a web-based email system and designate one or more email addresses as contact information of potential attendees of an event.

In some implementations, a designated potential attendee of an event may be provided with an indication of the event task and/or that the potential attendee has been associated with the event task. The potential attendee may be prompted to authorize communication engine 125 to access contact information of the potential attendee. For example, a user may create an event task and designate multiple users as potential attendees, and event engine 115 may provide the potential attendees with an invitation and/or notification of the event. A potential attendee may be prompted to affirm allowing communication engine 125 to utilize the potential attendee's contact information for providing notifications related to the user arrival information of the user. In some implementations, a user may create an event task and be prompted to designate information associated with the user that may be accessed by communication engine 125. For example, a user may create a task event, designate a potential attendee, and the user may be prompted to confirm that the communication engine 125 may access a contacts application of the user and identify the contact information of the potential attendee.

Event engine 115 may determine user arrival information of a user based on location information that is provided by one or more applications executing on computing device 105 and a starting time that is associated with an identified event task. Location information of a user may include, for example, a street address of the user based on location information received via computing device 105, GPS coordinates of the computing device 105, and/or a descriptor of the location of the user (e.g., "home," "Store 1") that is determined based on user location information received via computing device 105. In some implementations, a user may be prompted via computing device 105 before location information is utilized to determine user arrival information for the user.

Event engine 115 may determine user arrival information of a user based on identifying the starting time associated with an event task and identifying location information of the user within a time period before the starting time. For example, event engine 115 may identify an event task and determine user arrival information one hour prior to the starting time that is associated with the event task. In some implementations, event engine 115 may identify one or more upcoming events of the user and determine the location of the user prior to the start of the next event or events. For example, event engine 115 may identify the event task in event database 120 with a starting time that is closest in time, identify the location of the user, and periodically determine user arrival information based on the identified location of the user before the start of the event associated with the event task, such as once a minute.

In some implementations, event engine 115 may utilize the staring time of the identified event to determine arrival information related to the user. In some implementations, the arrival information may be a time that the user will likely arrive at the event location if the user began a trip to the event location a given time. For example, event engine 115 may determine the location of the user one hour before the starting time of an event task and further determine one or more travel paths between the user location and the event location. In some implementations, event engine 115 may determine a shortest path that the user may traverse to get to the event location. In some implementations, event engine 115 may determine a most likely path that the user will traverse based on, for example, previous trips of the user to the event location. In some implementations, event engine 115 may determine a path between the location of the user and the event location based on a path that is provided by the user. For example, the user may utilize a mapping application to provide a path that is the intended path of the user.

In some implementations, event engine 115 may determine a path based on the mode of transportation of the user. For example, event engine 115 may determine that the user is traveling by car based on the current speed of the user at the time that the location of the user is determined and determine a path that includes roads between the user location and the event location. Also, for example, event engine 115 may determine that the user is traveling by train based on determining that the speed of the user that is indicative of riding a train and/or that the user is located on a train route and further determine a path that includes train routes.

In some implementations, event engine 115 may determine one or more likely arrival times of the user based on the current location of the user and the event location. In some implementations, event engine 115 may determine an arrival time based on an average speed of the user and the length of a path between the user location and the event location. For example, event engine 115 may determine a likely path of the user to the event location that is 5 miles long and that the user is currently traveling at an average speed of 30 miles per hour. Event engine 115 may determine that the user will likely arrive at the event location in 10 minutes based on the route length and the speed.

In some implementations, user arrival information may be based on the user arriving near the event location. For example, event engine 115 may determine user arrival information based on an indication that the user has parked and that the user will be arriving at the event location soon (e.g., movement of the user has stopped or slowed and the user is located within a threshold distance to the event location that is indicative of walking). In some implementations, user arrival information that is based on the user being close to the event location may be determined based on input from the user. For example, the user may provide an indication via computing device 105 that the user has parked and is walking from the car of the user to the event location. In some implementations, the user may be prompted by event engine 115 via computing device 105 before user arrival information is determined when the user location is proximate to the event location. For example, event engine 115 may determine, based on user location information, that the user is near the event location and that the movement of the user is indicative of the user no longer driving. Event engine 115 may prompt the user on whether the user has interest in event engine 115 determining user arrival information that is related to the user arriving near the location.

In some implementations, event engine 115 may determine user arrival information that is based on the user leaving a location and beginning to travel to the event location. For example, event engine 115 may receive user location information of the user for a time period before the starting time associated with the event task and identify, based on the user location information, that the distance between the user and the event location is decreasing. Also, for example, event engine 115 may determine that the user is stationary for a period of time before the starting time and may determine that movement of the user is indicative of the user leaving a location and beginning to travel toward the event location. In some implementations, the user may provide event engine 115 with an indication that the user is beginning to travel toward the location. In some implementations, event engine 115 may prompt the user before user arrival information is determined that is based on movement of the user.

In some implementations, event engine 115 may determine a notification that may be provided to one or more of the identified attendees of the event based on the user arrival information and the event task. For example, a notification may be determined that indicates that the user will likely arrive at the event location before the starting time of the event. Also, for example, event engine 115 may determine a notification that indicates that the user will arrive after the start of the event and/or will not be attending the event based on the arrival information of the user. Also, for example, event engine 115 may determine a notification that includes information related to the user arriving at the event location. Also, for example, event engine 115 may determine a notification that includes information related to the user travelling to the event, such as a notification that the user is en route to the event location.

In some implementations, a user may be provided with one or more suggested messages to include with a notification based on the user arrival information and the starting time of the event. For example, for user arrival information that is indicative of a user likely arriving at the event after the starting time, a notification may be determined that includes one or more optional message suggestions that the user may include with the notification, such as "I'm running late" and/or "I'll be there in 10 minutes" based on user arrival information that indicates that the user will likely arrive at the event late and/or in 10 minutes. In some implementations, messages that are suggested to the user to provide with the notification may be based on a magnitude of time between the likely arrival time of the user and the starting time of the event. For example, a suggested message of "I'll be 10 minutes late" may be suggested to the user to provide with a notification if the magnitude of time between the likely arrival time and the starting time of the event is 10 minutes. Also, for example, a suggested message of "I'll be 30 minutes late" may be suggested to the user to provide with the notification if the magnitude of time between the likely arrival time of the user and the starting time of the event is 30 minutes. Also, for example, a notification determined based on user arrival information that is indicative of the user parking and/or arriving at the event may include "We are parking" and/or "We just got here." In some implementations, the suggested messages that may be associated with a notification may change based on changes in user arrival information. For example, a message suggestion of "I'm running late" may be provided when the user is likely to arrive at the event location within 30 minutes of the starting time of the event and a message suggestion of "I'm not going to make it" may be suggested to the user to include in a notification when the user arrival information is indicative of the user likely arriving at the event location more than 30 minutes after the starting time of the event. In some implementations, the user may be provided with multiple suggested messages and the user may select one or more messages to include with the notification. For example, a user may be provided with a list of suggested messages that includes "I'll be there in an hour" and "I'm not going to be able to make it" and the user may select the message that is appropriate. Also, for example, a user may submit an alternate message to include with a notification.

In some implementations, a notification may be based on information that is related to an event type of the event. For example, a user may optionally select an event type when an event is created, such as a "Business Meeting" event type and/or a "Dinner" event type. In some implementations, the type of notification and/or the timing of providing a notification may be based on the event type. For example, a notification that is indicative of the user likely arriving at the event location after the starting time of the event for an event with a "Business Meeting" may be determined if the user is likely to arrive at the event any time after the starting time of the event, whereas an event with a "Dinner" event type may be determined only if the user is likely to arrive more than 10 minutes after the starting time of the event. Also, for example, an event with a "Dinner" event type may have a determined notification that includes one or more messages or message suggestions related to dining, such as "Order without me," whereas an event with a "Business Meeting" event type may include one or more messages or message suggestions that are related to a meeting, such as "I will need to reschedule."

In some implementations, an event task may be associated with information that indicates one or more attendees of the event and/or one or more users that have expressed interest in attending the event. In some implementations, the attendees may be determined based on one or more users that have been provided an invitation to the event by the user. For example, a user may designate one or more contacts and an invitation may be provided by communication engine 125 to the users that are have been designated by the user. In some implementations, an invitation to an event may be provided publically and/or to a group of users and users may indicate interest in attending the event. For example, a user may post an event invitation on a social networking website and other users, such as a group of users of the social networking website and/or contacts of the user, may select the invitation and express interest in attending the event.

Communication engine 125 may identify attendees that are associated with an event task, determine contact information for the attendees, and send one or more notifications that have been determined by event engine 115. In some implementations, attendees may be prompted to authorize receiving notifications from communication engine 125. In some implementations, users may be prompted to authorize sending notifications to one or more attendees. Notifications may be provided to attendees, for example, via email, text messages, instant messages, and/or social media postings.

In some implementations, an attendee that is authorized to receive a notification may be provided with one or more notifications related to the event. For example, an event may be created by a user and an invitation may be sent to a potential attendee that includes an option to allow event engine 115 to send notifications. In some implementations, the user may be prompted to select attendees of an event that may be provided with notifications. For example, event engine 115 may determine a notification related to the user likely arriving at the event after the starting time and the user may select one or more attendees as recipients of the notification. Also, for example, a user may select attendees that are authorized recipients of notifications when the event task is initially created.

In some implementations, event engine 115 may prompt a user before sending a notification. For example, event engine 115 may determine that the user will likely arrive at the event location after the starting time of the event, prompt the user via computing device 105 whether the user would like a notification to be provided to one or more other attendees, and send the notification to the other attendees only after the user has given permission to do so. In some implementations, the user may be given an option to provide notifications to selected attendees. For example, an event may include ten attendees and the user may be provided an option to provide a notification to all ten attendees or less than all of the event attendees.

Figure 2:
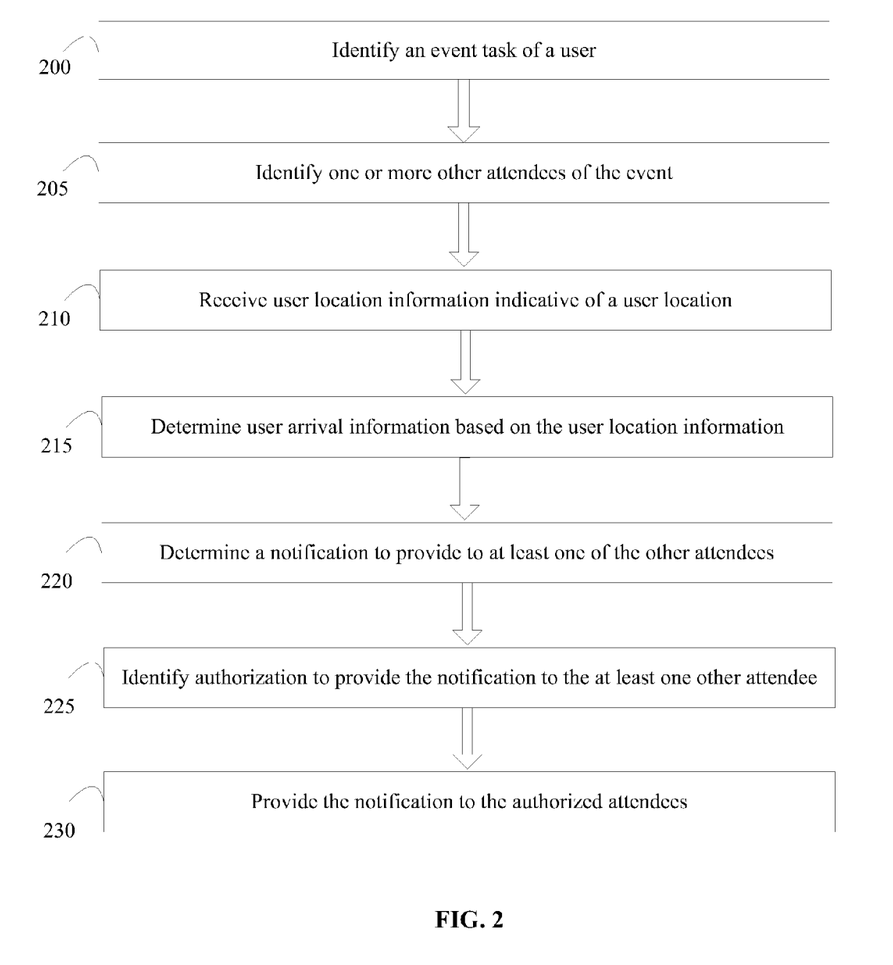
FIG. 2 is a flow chart of an example method for determining a notification to provide to at least one attendee of an event based on arrival information of a user.

Referring to FIG. 2, a flow chart of an example method for determining a notification to provide to at least one attendee of an event based on arrival information of a user is provided. Other implementations may perform the steps in a different order, omit certain steps, and/or perform different and/or optional steps than those illustrated in FIG. 2. For convenience, aspects of FIG. 2 will be described with reference to one or more components of FIG. 1 that may perform the method, such as the event engine 115 and/or the communication engine 125.

At step 200, an event task of a user is identified. The task may be identified by event engine 115 via one or more databases that share one or more aspects with event database 120. In some implementations, an event may include a starting time, an ending time, a location, an event type, and/or one or more designated attendees. In some implementations, the identified event may have been created by one or more attendees of the event, the user, and/or one or more systems. For example, a user may create an event utilizing a calendar application, an email application, and/or one or more social media applications. Also, for example, a system may identify information in one or more messages between users and determine an event task based on terms in the messages At step 205, one or more other attendees of the event are identified. In some implementations, the attendees may be identified by a user and associated with the event task. For example, a user may indicate one or more attendees of an event when the event was created. Also, for example, event engine 115 may identify one or more messages that were utilized to create an event and identify the sender and/or recipients of the messages as attendees of the event. In some implementations, one or more potential attendees of the event may be provided with an invitation to the event and potential attendees that affirmatively respond to the invitation may be identified as attendees.

At step 210, user location information that is indicative of a user location is received. In some implementations, user location information may be received via computing device 105. For example, user location information may include GPS coordinates and/or a street address of the computing device 105 that is determined based on a GPS receiver, Wi-Fi transmitter, and/or via cellular tower triangulation. The location of the computing device 105 may be indicative of the location of the user. In some implementations, the user may provide one or more systems with user location information. For example, the user may check-in via a social media system and the social media system may provide event engine 115 with the location where the user checked-in.

At step 215, arrival information for the user is determined based on the location of the user. In some implementations, user arrival information may be indicative of the likely arrival time of the user. For example, user arrival time may be determined based on determining a likely path between the user and the event location and determining when the user will likely arrive at the event location based on the speed of the user and/or whether the user is en route to the event location on the determined path. In some implementations, user arrival information may be determined based on determining that the user location is within a threshold distance of the event location. In some implementations, user arrival information may be determined based on determining that the user has begun to travel toward the event location.

At step 220, a notification is determined to provide to one or more attendees of the event. In some implementations, the notification may include one or more messages that are indicative of the user arrival information. For example, a notification may include "I'm running late" if the user arrival information is indicative of the user likely arriving at the event location after the starting time of the event. Also, for example, a notification may include "I'll be there in 20 minutes" if the user arrival information is indicative of a likely user arrival time that is 20 minutes after the starting time of the event. In some implementations, a user may select from one or more messages to include in a notification. In some implementations, a notification may be further based on one or more other aspects of the event task, such as an event type.

At step 225, authorization to provide the notification to at least one of the attendees is identified. In some implementations, authorization may be provided by the user. For example, a user may be prompted by communication engine 125 to indicate which attendees of the event will be provided with the notification. In some implementations, an attendee may provide authorization before the attendee receives a notification. For example, a user may create an event task and provide a potential attendee with an invitation to the event. The potential attendee may be provided with an option to accept attending the event and additionally be provided with an option to allow for communication of event notifications.

At step 230, the notification is provided to the authorized attendees. In some implementations, the notification may be provided to the authorized attendees via computing device 105.

Figure 3A:
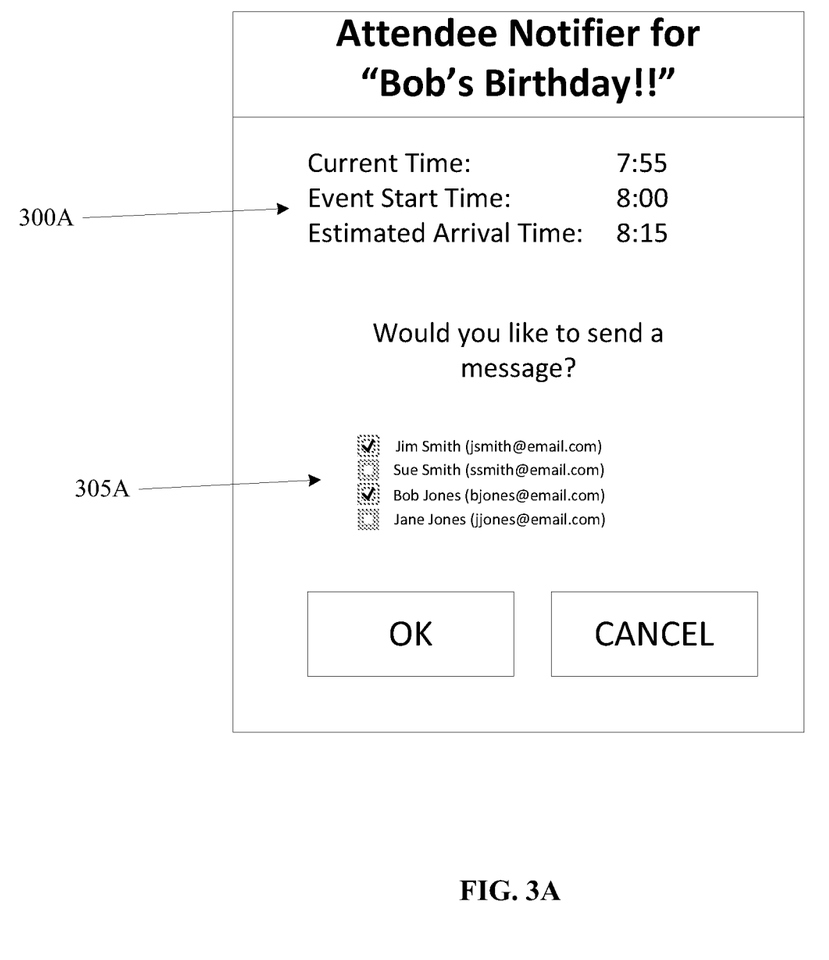
FIG. 3A is an example interface that can be utilized to prompt a user to send a notification related to an event.

Referring to FIG. 3A, an example interface that can be utilized to prompt a user to send a notification related to an event is illustrated. The interface may be provided to the user via a device that shares one or more characteristics with computing device 105. In some implementations, the interface may be provided to the user based on identifying an event task of a user and determining user arrival information before providing a notification based on the user arrival to one or more attendees of the event. In some implementations, the user interface may not be provided to the user and a notification may be provided to the attendees when the notification has been determined by event engine 115. In some implementations, the interface may be provided to the user before notifications are provided to other attendees to ensure that the user has interest in providing the notifications to the attendees. For example, event engine 115 may determine a notification based on an event task and user arrival information, communication engine 125 may identify one or more attendees associated with the event task, and communication engine 125 may prompt the user before sending the notification to attendees of the event.

In the illustrated example, the user is provided with determined user arrival information 300A. The user arrival information includes the current time, the event starting time, and the estimated arrival time of the user. The event starting time may be identified by event engine 115 based on information associated with the identified event task of the user. For example, event engine 115 may identify an event of "Bob's birthday!!" as the event name of an event task of the user and identify a starting time for the event of "8:00" that is associated with the event task. The arrival time of the user may be determined by event engine 115 based on the determined location of the user, the starting time associated with the event task, the current time, and the estimated travel distance between the current location of the user and the event location. For example, event engine 115 may determine the current location of the user, determine a likely path from the location of the user to the event location, and determine an estimated speed of the user if the user takes the determined path.

In the provided example, event engine 115 has determined user arrival information 300A that includes an event starting time of "8:00" and an estimated arrival time of the user of "8:15," fifteen minutes after the start of the event. Event engine 115 may determine that the user is unlikely to arrive at the event location before the starting time of the event based on the estimated arrival time. The user may be provided the prompt of FIG. 3A via computing device 105 before a notification is provided to one or more attendees of the event.

In some implementations, the prompt may be provided to the user when event engine 115 determines that the user is beginning to travel to the event location. For example, event engine 115 may determine that, based on the user location, the user has not started traveling to the event location (e.g., determining that the user location has changed less than a threshold distance for a time period). The user may be provided the prompt when the location of the user changes by a threshold distance and/or when the location of the user is indicative of the user traveling to the event location.

In some implementations, the prompt may be provided to the user when the user is determined to be within a threshold distance of the event location. For example, the user may be provided with the prompt when the user is within 0.1 miles of the event and/or when the user location is determined to be within a distance that is indicative of the user parking near the event location, such as determining that the speed of the user is indicative of walking after the user has been determined to be driving a vehicle. The user may be provided with one or more messages to include with a determined notification, such as "We are parking." Additionally or alternatively, the notification may include one or more aspects of the user arrival information. For example, for user arrival information that is indicative of the user parking, the user may be provided with a suggested message to include with the notification that includes the user location, such as "We parked on Main Street" when the user is determined to be within a threshold distance of the event location and movement of the user is indicative of walking after movement of the user that is indicative of driving.

In some implementations, the user may be provided with one or more optional messages to provide to other attendees of the event. For example, in instances where the user is likely going to be late to an event, the user may select a notification that includes a message of "I'm going to be late," "I'm 15 minutes away," "Start without me," "I'm 2 miles away," and/or a personal message that may be submitted by the user when the user is provided the prompt. Also, for example, in an instance where event engine 115 determines that the user has left a location and is heading to the event location, the user may be given an option to provide a notification that includes "I'm on my way" and/or "I just left."

Contacts selection list 305A includes attendees and contact information that may be associated with the event task "Bob's Birthday!!" In some implementations, communication engine 120 may identify the contacts and/or contact information of the contacts from one or more applications and/or databases. For example, event engine 115 may identify "Jim Smith" as an attendee associated with a task event and communication engine 120 may identify contact information for "Jim Smith," such as an email address, a cellular phone number, and/or a social media webpage for "Jim Smith." Communication engine 120 may identify attendee contact information from, for example, emails and/or an email application of the user, a calendar application of the user, social media sources, webpages, a contacts application of the user, and/or a user may associate contact information of an attendee with an event task.

In the contacts selection list 305B, the user is provided with the attendees, contact information for the attendees, and an option select attendees to receive the notification. In the illustrated example, the user has selected "Jim Smith" and "Bob Jones" as recipients of the notification. In some implementations, contacts selection list 305B may include only attendees that have authorized receiving notifications regarding the event. For example, contacts selection list 305B may include only the attendees that have received an invitation to the event and that have affirmatively indicated an interest in receiving notifications. In some implementations, the contacts selection list 305B may not be included in a notification and the notification may be provided to attendees that have previously authorized receiving notifications. For example, the user may be provided a prompt that will be sent to all attendees of an event when the user selects the "OK" button of the prompt.

Figure 3B:
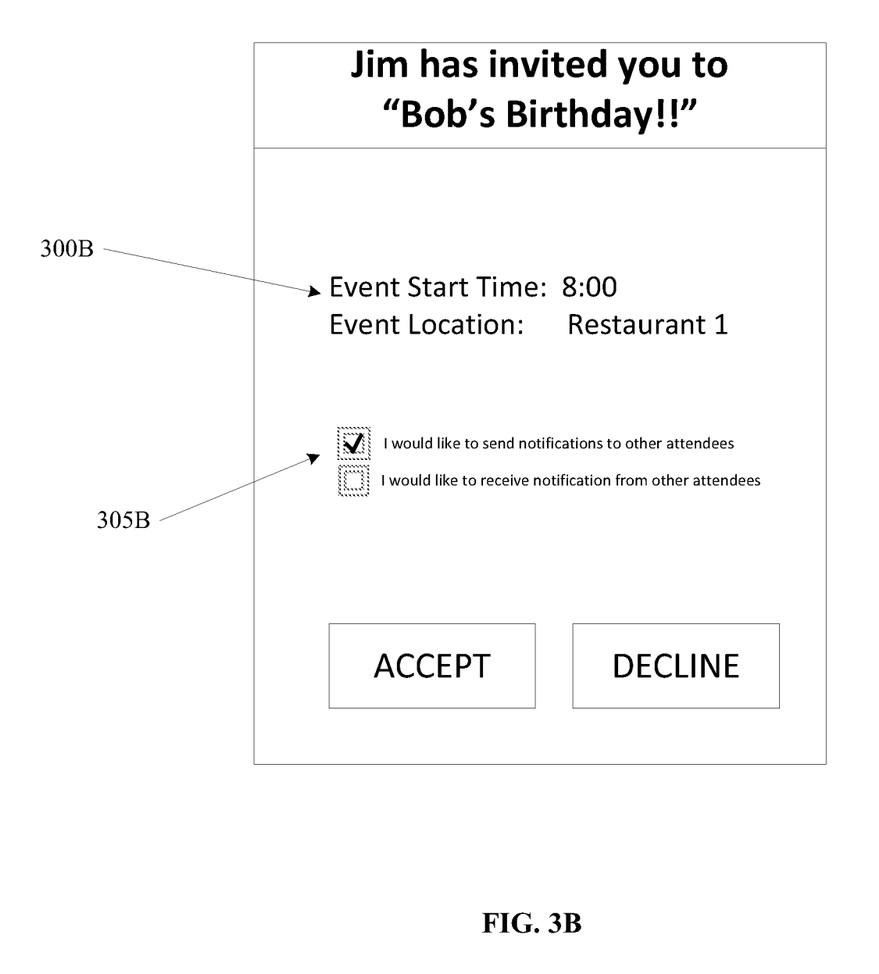
FIG. 3B is an example interface that may be utilized to provide a potential attendee with an invitation to an event.

Referring to FIG. 3B, an example interface that may be utilized to provide a potential attendee with an invitation to an event is illustrated. In some implementations, the invitation may be provided to the potential attendee by communication engine 125 in response to a submission from the computing device 105. The invitation includes event information 300B and notification authorization 305B. In some implementations, the invitation may be provided to a potential attendee when a user creates an event task and designates the receiver of the invitation as a potential attendee. The attendee may select "ACCEPT" to be associated with the event task as an attendee. The receiver may select "DECLINE" to decline the event invitation. In some implementations, the potential attendee may be provided with other options, such as a "MAYBE" option if the potential receiver is unsure of whether the receiver will be attending the event at the time of receiving the invitation.

Notification authorization 305B includes options that may be selected by the receiver of the notification that are related to receiving and/or sending notifications regarding the event task. In the illustrated notification, the receiver has indicated that "I would like to send notification to other attendees." By selecting this option and accepting the invitation, the receiver may be associated with the event task as an attendee and additionally may authorize event engine 115 to determine user arrival information and/or provide other users with notifications via communication engine 125. For example, an attendee that has selected this option may authorize event engine 115 to send a notification to the attendee regarding another attendee likely arriving late to the event. Additionally, the user is provided with an option "I would like to receive notifications from other attendees." By selecting that option and accepting the invitation, the attendee may authorize communication engine 125 to utilize the attendee's contact information to provide notifications regarding other attendees. For example, an attendee that selects that option may authorize communication engine 125 to send notifications related to user arrival information of other attendees.

Figure 4:
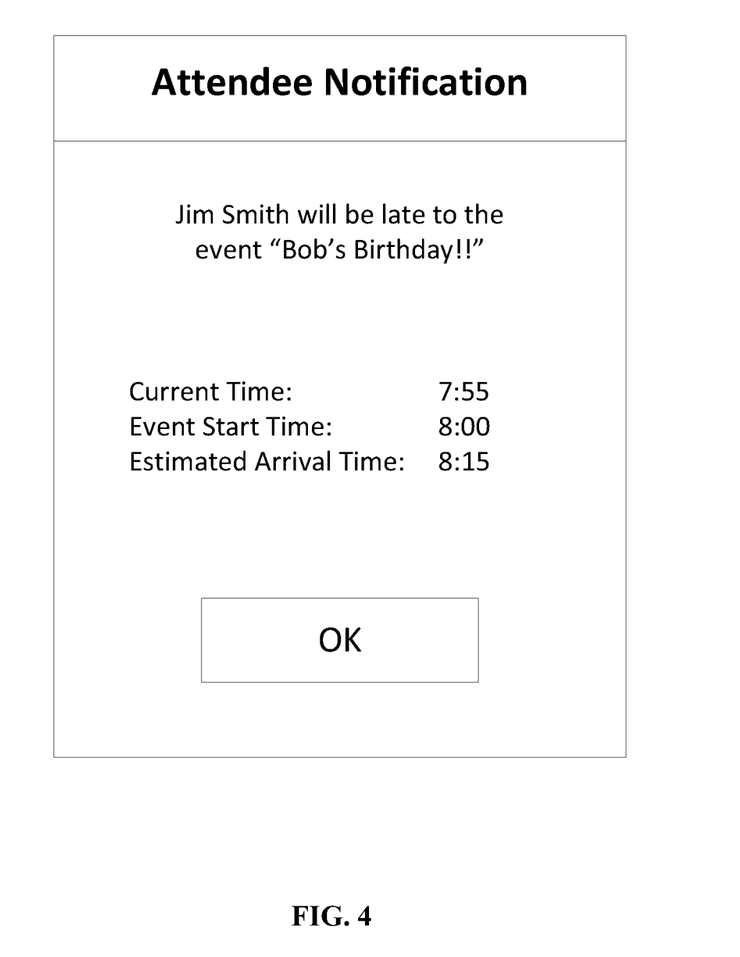
FIG. 4 is an example illustration of a notification that may be provided to an attendee of an event.

Referring to FIG. 4, an example illustration of a notification that may be provided to an attendee of an event is provided. The notification may be provided to an attendee via a computing device that shares one or more characteristics with computing device 105. In some implementations, the notification may be provided to the attendee in response to event engine 115 determining that another attendee of the event is likely to arrive at the event after the starting time of the event. For example, the notification provides the name of an attendee, "Jim Smith," and that the attendee is likely going to be late to the event "Bob's Birthday." In some implementations, the notification may be provided to the attendee via email, text message, and/or an application that is dedicated to scheduling and/or notifying attendees of events, such as a calendar application.

The provided notification includes the current time, the event starting time, and the estimated arrival time of the attendee. In some implementations, the notification may be provided to the attendee only if the user that is the subject of the notification (i.e., "Jim Smith") has authorized the notification to be provided. In some implementations, the notification may be provided to an attendee only if the attendee has authorized receiving the notification. For example, an attendee may create an event and/or may be provided with an invitation to an event and the attendee may be provided an option to receive notifications based on the location of other attendees of the event prior to the start of the event.

In some implementations, an attendee may authorize and/or select what information to provide via notifications to other attendees and/or attendees may select what information to receive via notifications regarding other attendees of an event. For example, an attendee may provide notifications to other attendees that do not include information regarding the estimated arrival time of the attendee and/or an attendee may select to provide other attendees with notifications that include a location.

FIG. 5 is a block diagram of an example computer system 510. Computer system 510 typically includes at least one processor 514 which communicates with a number of peripheral devices via bus subsystem 512. These peripheral devices may include a storage subsystem 524, including, for example, a memory subsystem 526 and a file storage subsystem 528, user interface input devices 522, user interface output devices 520, and a network interface subsystem 516. The input and output devices allow user interaction with computer system 510. Network interface subsystem 516 provides an interface to outside networks and is coupled to corresponding interface devices in other computer systems.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 510 to the user or to another machine or computer system.

Storage subsystem 524 stores programming and data constructs that provide the functionality of some or all of the modules described herein. For example, the storage subsystem 524 may include the logic to identify an event associated with a user and determine a notification to provide to one or more attendees of the event based on user arrival information. These software modules are generally executed by processor 514 alone or in combination with other processors. Memory 526 used in the storage subsystem can include a number of memories including a main random access memory (RAM) 530 for storage of instructions and data during program execution and a read only memory (ROM) 532 in which fixed instructions are stored. A file storage subsystem 528 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 528 in the storage subsystem 524, or in other machines accessible by the processor(s) 514.

Bus subsystem 512 provides a mechanism for letting the various components and subsystems of computer system 510 communicate with each other as intended. Although bus subsystem 512 is shown schematically as a single bus, alternative implementations of the bus subsystem may use multiple busses.

Computer system 510 can be of varying types including a workstation, server, computing cluster, blade server, server farm, or any other data processing system or computing device. Due to the ever-changing nature of computers and networks, the description of computer system 510 depicted in FIG. 5 is intended only as a specific example for purposes of illustrating some implementations. Many other configurations of computer system 510 are possible having more or fewer components than the computer system depicted in FIG. 5.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A computer implemented method, comprising:
    identifying, via one or more databases, an event task created by a user and an event type assigned to the event task in one or more of the databases, the event type being assigned to the event task and to a plurality of additional event tasks that are of the event type, wherein the event task includes a starting time of an event and an event location;
    identifying, via one or more databases, one or more other attendees of the event;
    providing, in response to creation of the event task by the user, a prompt to an additional computing device of one attendee of the other attendees, the prompt being to affirm providing, to the at least one attendee, notifications related to the event task;
    receiving, in response to providing the prompt, an affirmative indication that the one attendee desires to receive notifications related to the task, the affirmative indication received in response to interaction with the prompt via a user interface input device of the additional computing device;
    receiving user location information indicative of a user location of a user, the user location information being provided by a computing device of the user and being based on sensor data from one or more location sensors of the computing device;
    determining user arrival information, wherein the user arrival information is based on the user location information and the starting time;
    determining whether the user arrival information satisfies a threshold that is specific to the event type;
    in response to determining the user arrival information satisfies the threshold:
        determining a notification to provide to at least one attendee of the other attendees, wherein determining the notification is based on the user arrival information and the event type of the event task, wherein determining the notification based on the event type comprises incorporating, in the notification, text that is specific to the event type, and
        providing, to the computing device of the user, an additional prompt related to providing the notification;
    determining to provide the notification based on interaction with the additional prompt by the user via the user interface input device of the computing device of the user and based on having received the affirmative indication; and
    in response to determining to provide the notification, providing the notification to the additional computing device or another computing device of the one attendee for display to the one attendee via the additional computing device or the another computing device.

2. The method of claim 1, wherein the user arrival information is distance between the user and the event location.

3. The method of claim 2, wherein the user arrival information is based on an estimated arrival time and wherein determining the estimated arrival time is based on length of an estimated travel path of the user.

4. The method of claim 3, wherein determining the notification is based on the magnitude of the difference between the estimated arrival time and the starting time.

5. The method of claim 3, wherein determining to provide the notification occurs when the estimated arrival time is before the starting time.

6. The method of claim 3, wherein determining the estimated travel path includes determining a mode of transportation of the user.

7. The method of claim 1, wherein the user arrival information is based on a user starting location.

8. The method of claim 7, wherein the notification is indicative of the user leaving the starting location.

9. The method of claim 1, wherein the user arrival information is indicative of the user being within a threshold distance of the event location, and wherein the notification includes the user location.

10. A system including memory and one or more processors operable to execute instructions stored in memory, comprising instructions to:
   identify, via one or more databases, an event task of a user, wherein the event task includes a starting time of an event and an event location;
   identify, via one or more databases, one or more other attendees of the event;
   provide, based on creation of the event task by the user, a prompt to the one attendee of the other attendees, the prompt being to affirm providing, to the at least one attendee, notifications related to the event task;
   receive, in response to providing the prompt, an affirmative indication that the one attendee desires to receive notifications related to the task, the affirmative indication received in response to interaction with the prompt via a user interface input device of the additional computing device;
   receive user location information indicative of user locations of a user over time and movement parameters corresponding to the user locations, the user location information being provided by a computing device of the user and being based on sensor data from one or more location sensors of the computing device;
   determine, based on the locations and the movement parameters of the user location information, user parking information that indicates where the user has parked, wherein the instructions to determine the user parking information include instructions to:
      determine that a user was driving toward the event location,
      determine that the user is within a threshold distance of the event location and is no longer driving, and
      determine the user parking information based on a location, of the user locations of the user location information, that corresponds to the user being within the threshold distance of the event location and no longer driving; and
   determine a notification to provide to at least one attendee of the other attendees, wherein the notification is determined based on the user parking information and the event task, and wherein the notification includes information related to the event task and includes the user parking information that indicates where the user has parked;
   provide, to a computing device of the user and in response to determining the user parking information, an additional prompt related to providing the notification to the one attendee;
   in response to interaction with the prompt by the user via a user interface input device of the computing device of the user, provide the notification to the additional computing device of the one attendee or another computing device of the one attendee, wherein providing the notification is further based on having received the affirmative indication.

11. A system including memory and one or more processors operable to execute instructions stored in memory, comprising instructions to:
   identify, via one or more databases, an event task of a user and an event type assigned to the event task in one or more of the databases, the event type being assigned to the event task and to a plurality of additional event tasks that are of the event type, wherein the event task includes a starting time of an event and an event location;
   identify, via one or more databases, one or more other attendees of the event;
   provide, in response to creation of the event task by the user, a prompt to an additional computing device of one attendee of the other attendees, the prompt being to affirm providing, to the at least one attendee, notifications related to the event task;
   receive, in response to providing the prompt, an affirmative indication that the one attendee desires to receive notifications related to the task, the affirmative indication received in response to interaction with the prompt via a user interface input device of the additional computing device;
   receive user location information indicative of a user location of a user, the user location information being provided by a computing device of the user and being based on sensor data from one or more location sensors of the computing device;
   determine user arrival information, wherein the user arrival information is based on the user location information and the starting time;
   determine whether the user arrival information satisfies a threshold that is specific to the event type;
   in response to determining the user arrival information satisfies the threshold:
      determine a notification to provide to at least one attendee of the other attendees, wherein determining the notification is based on the user arrival information and the event type of the event task, wherein determining the notification based on the event type comprises incorporating, in the notification, text that is specific to the event type, and
      provide, to the computing device of the user, an additional prompt related to providing the notification;
   determine to provide the notification based on interaction with the additional prompt by the user via the user interface input device of the computing device of the user and based on having received the affirmative indication; and
   in response to determining to provide the notification, provide the notification to the additional computing device or another computing device of the one attendee for display to the one attendee via the additional computing device or the another computing device.

* * * * *